United States Patent Office 3,489,570
Patented Jan. 13, 1970

3,489,570
PROCESS FOR MAKING TEMPA
Peter P. Noznick, Evanston, and Anthony J. Luksas, Chicago, Ill., assignors to Beatrice Food Co., Chicago, Ill., a corporation of Delaware
No Drawing. Continuation-in-part of application Ser. No. 456,842, May 18, 1965. This application May 2, 1968, Ser. No. 726,222
Int. Cl. A23l 1/20
U.S. Cl. 99—98                                    4 Claims

ABSTRACT OF THE DISCLOSURE

Tempa is prepared by comminuting wet whole soybeans to form a slurry which approaches a solution. The slurry is sterilized and maintained sterile throughout the balance of the process. The slurry is placed in a fermentor, inoculated with tempa mold and strongly agitated and aerated. The fermented slurry is pasteurized and dried.

---

This application is a continuation-in-part of application Ser. No. 456,842, filed May 18, 1965, now abandoned.

This invention relates to a process for making tempa.

Tempa, also known as tempeh, is a popular food of Indonesia. It is prepared from cooked and dehulled soybeans fermented with the "tempa mold." The prior art method for making tempa is as follows: Dry soybeans are either soaked overnight in water or boiled in water for 30 minutes to 2 hours, to allow the beans to absorb water. The hulls or skins of the wet soybeans are then removed by hand and the remainder is inoculated with the "tempa mold." Tempa mold has been stated to be *Rhizopus oligosporum*, and it is conveniently available in previously fermented tempa. After the dehulled soybeans are mixed with some previously fermented tempa, they are placed in a container such as a potato sack or a plastic bag with holes thereon. This bag of inoculated beans is then incubated in a moist environment, at about 90% relative humidity and about 25–37° C., until the mycelium of the tempa mold has grown over and through the soybeans to make a solid mass. The mycelium mat has a white cottony appearance.

The mass of soybeans and the mold mycelium may be thinly sliced, dipped in salt water, deep-fat fried, and promptly consumed. If the tempa is to be preserved, the raw cake may be sliced and then boiled to destroy the mold or fungi. The boiled tempa may be frozen and kept until it is ready to be cooked.

The prior art method of making tempa is inadequate because the hulls must be largely removed by hand which entails much time and labor. Furthermore, since the inoculated soybeans are incubated with the bags containing them, this method does not permit the economical processing of large quantities at any one time.

Hesseltine et al. Patent 3,243,301 discloses a process of preparing tempa. This patent shows making tempa by inoculating cracked wheat alone or mixed with preboiled soybean grits with tempa mold and growing the mold on the cereal in cake form in petri dishes. This process has the disadvantage that only small amounts of tempa can be prepared at one time. Additionally, the oil is removed prior to making the grits. Since the tempa mold requires oxygen for growth, the cake must be in very thin layers, the mycelin of the mold holding the cake together. There is no inoculation of the mold throughout the entire system. The Hesseltine et al. procedure also is not carried out under sterile conditions but instead the boiling only removes the surface microbes.

It is, therefore, an object of the present invention to provide a novel and economical method for making tempa.

It is another object of the present invention to provide a novel method for making tempa in large quantities economically.

Other objects will be apparent from the following disclosure and claims.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by a method of preparing tempa in powdered form from soybeans in large quantities and economically. A critical feature of the present invention is that sterile conditions be maintained throughout the process and that the growth of the tempa forming organism be carried out with strong agitation with the introduction of air while the soybeans in ground or macerated condition are in an aqueous slurry. The macerated soybean slurry approaches a solution in form.

According to a preferred embodiment of the present invention, powdered tempa is made as follows: whole soybeans are either ground to a powder and rehydrated with water or are soaked in water, e.g. overnight, and the wet cooked beans are ground or macerated without removing the hulls. The product is homogenized as a slurry in water at a solids content which is preferably about 10%. This slurry is then run through a heat exchanger to sterilize it. The preferred sterilization temperature is about 275° F. for about 15 seconds, although lower temperatures at correspondingly longer periods of time may be employed. The sterilized slurry is placed in a fermenter and inoculated with a strain of the tempa mold, such as *Rhizopus oligosporum* or *Rhizopus niger*, for about 12–96 hours with constant agitation, e.g. by stirring, and constant aeration. The fermented tempa slurry was then sterilized again by pasteurization to destroy the active fungi (the only organism present) and dried to form powdered tempa.

Although the tempa mold is conveniently available in previously fermented tempa, there are other sources. See, e.g., Hesseltine, Smith, Bradle and Djien, Investigations of Tempeh, an Indonesian Food, Four Developments in Industrial Microbiology 275–288 (1963), for a list of the various strains of the tempa mold and their sources. These authors report that one strain of the tempeh mold has been isolated from Texas soil.

The pasteurized tempa slurry made according to the present invention may be dried in any convenient manner. For example, it may be spray dried, roller dried, tray dried, freeze dried, etc. The resultant product is powdered tempa.

The powdered tempa of the present invention has all of the essential characteristics, e.g., taste and edibility, of the prior art tempa. Substantial savings in labor and time are effected by the method of the present invention because the hulls of the soybeans are no longer required to be removed at all, much less removed by hand. Since the inoculated soybeans are fermented in a slurry, the method of the present invention permits large quantities of beans to be economically processed at the same time.

EXAMPLE 1

Soybeans were soaked overnight in water. Whole and wet soybeans were macerated with their hulls on. The soybeans, after maceration, approached a solution. The solids content of the resultant slurry was adjusted to 10%. This slurry was sterilized by running through a heat exchanger at 275° F. for 15 seconds. (Lower temperatures may be used with longer contact time.) A thousand gallons of the sterilized slurry were placed in a sterile fermentor under sterile conditions and inoculated with *Rhizopus oligosporum*. The slurry, after inoculation, is stirred with good agitation established. While the slurry is being stirred it is aerated with about 2.5 volumes of air per volume of slurry. This fermentation under the above conditions was continued for 24 hours. The fermented tempa was then spray dried to give powdered tempa.

The aeration can be accomplished with 0.1 to 5 volumes of air per volume of slurry. If a very high level of inoculum, as in natural tempa fermentation, is used, the fermentation time can be reduced to 12 hours.

EXAMPLE 2

Example 1 was repeated except that the incubation period with the *Rhizopus oligosporum* was 48 hours.

EXAMPLE 3

Example 1 was repeated except that the *Rhizopus niger* was used in place of the *Rhizopus oligosporum*, and that the sterilized slurry was incubated for 72 hours. Powdered tempa was again obtained.

EXAMPLE 4

Example 1 was repeated but the incubation period was 96 hours. The product was powdered tempa having the same characteristics as that obtained in Example 1.

By sterilization there is meant that no microorganisms are permitted to be in contact with the slurry except for the tempa mold which latter is present only during the fermentation.

We claim:
1. A process for making dried tempa powder comprising forming an aqueous slurry of comminuted whole soybeans, sterilizing the slurry by heating to at least 275° F. for at least 15 seconds, and maintaining said slurry sterile throughout the remainder of the process, inoculating the slurry with tempa mold and fermenting the thus inoculated soybean slurry while continuously agitating and aerating the same, said fermentation being carried out for 12 to 96 hours, pasteurizing the fermented slurry to destroy the tempa mold and drying the tempa thus formed.

2. A process according to claim 1 wherein the pasteurized tempa is spray dried.

3. A process according to claim 1 wherein the air is introduced into the slurry in an amount of 0.1 to 5 volumes per volume of slurry.

4. Spray dried, powdered tempa produced by the process of claim 2.

References Cited

UNITED STATES PATENTS

| 3,228,773 | 1/1966 | Hesseltine et al. | 99—98 |
| 3,243,301 | 3/1966 | Hesseltine et al. | 99—80 |
| 3,345,179 | 10/1967 | Pollock et al. | 99—31 |

OTHER REFERENCES

Hesseltine, C. W., Reprint from Mycologia, vol. LVII, No. 2, March-April 1965, page 161 (copy in Group 172, Class 99—98 lit.).

A. LOUIS MONACELL, Primary Examiner